United States Patent [19]

Weber

[11] Patent Number: 4,648,577
[45] Date of Patent: Mar. 10, 1987

[54] VISCOUS DAMPER HAVING A CONICAL PLUNGER TUBE

[75] Inventor: Frank-Michael Weber, Berlin, Fed. Rep. of Germany

[73] Assignee: GERB Gesellschaft fur Isolierung mbH & Co., KG, Berlin, Fed. Rep. of Germany

[21] Appl. No.: 749,410

[22] Filed: Jun. 27, 1985

[30] Foreign Application Priority Data

Jun. 27, 1984 [DE] Fed. Rep. of Germany ....... 3424338

[51] Int. Cl.$^4$ ............................................. F16M 13/00
[52] U.S. Cl. ..................................... 248/562; 188/380; 248/631; 248/636; 267/127
[58] Field of Search .............. 248/562, 565, 636, 631; 267/8 R, 136, 127; 188/380, 379, 378, 317

[56] References Cited

U.S. PATENT DOCUMENTS

| | | | |
|---|---|---|---|
| 1,942,695 | 1/1934 | Gross | 188/282 |
| 2,597,800 | 5/1952 | Hussman | 248/565 |
| 3,876,044 | 4/1975 | Kendall et al. | 188/317 X |

FOREIGN PATENT DOCUMENTS

| | | | |
|---|---|---|---|
| 595297 | 9/1925 | France | 267/8 |
| 1128058 | 1/1957 | France | 248/565 |
| 2069815 | 9/1971 | France | 248/562 |
| 0204347 | 12/1982 | Japan | 248/562 |
| 247727 | 11/1969 | U.S.S.R. | 248/562 |

*Primary Examiner*—Robert W. Gibson, Jr.
*Assistant Examiner*—David L. Talbott
*Attorney, Agent, or Firm*—Oblon, Fisher, Spivak, McClelland & Maier

[57] ABSTRACT

A damper which comprises a damper housing and a damper plunger in which the damper plunger comprises a top plate for the reception of an object that is to be damped, and a plunger tube. The plunger tube is frusto-conical in configuration and can be moved into and out of a damping medium present in the damper housing, the larger cone diameter end of the plunger tube being directed into the damper medium.

9 Claims, 4 Drawing Figures

VISCOUS DAMPER HAVING A CONICAL PLUNGER TUBE

BACKGROUND OF THE INVENTION

This invention relates to a vibration damper, for objects that are required to be installed so as to be capable of yielding movement, more especially machines, comprising a damping plunger having a top plate for the reception of the object and a plunger tube for moving into and out of a damper housing which contains a viscous damping medium.

PRIOR ART

Such vibration dampers (or oscillation dampers), as are described for example in U.S. Pat. No. 2,597,800, extract kinetic energy from systems which are capable of motion, more especially those which are capable of vibration. They are used both in conjunction with elasticities for active and passive isolation of vibrations and for limiting dynamic spring deflections in the case of machinery, machinery foundations, on pipelines and the like. With the friction dampers, hydraulic dampers or viscous dampers known from the said publication, the same damping forces are provided for both the directions (i.e. the push and pull directions) of the vibration movements.

In the case of such dampers, the damping forces are generated by shearing action and displacement upon the relative movement of the damper plunger and the damping medium. The damping resistance occurring in this case depends upon the damper geometry and the properties of the visco-elastic damping medium. Upon the damping, kinetic energy is extracted from the vibratory system that is to be damped, and is converted into thermal energy. The damping medium is thereby warmed, with the result that in turn the viscosity of the medium is varied and in the normal case the damping resistance is reduced.

For the active and passive vibration isolation of prime movers or processing machines, viscous dampers are used either in addition to or as part of a spring body which brings about elasticity of the mounting of of the machine. The magnitude of the damping force necessary for limiting the vibration response is dependent upon the mounting elasticity and the shape or nature of the force stimulation signal. Forging hammers and presses, for example, generate force stimulation signals the main impulse of which acts in the direction of the machine mounting.

Such transformation machines can be erected for active isolation for example on a foundation which is mounted in a resilient and damped manner, or, with adequate machine mass, directly on a spring body and damper. In this respect, in the event of unfavourable transformation parameters, it can lead to path amplitudes of the elastic mounting elements which are larger than precalculated. The damper can, in these conditions, be overstressed, which manifests itself as a collapse of the shearing forces in the boundary layer between the damping medium and the damper plunger; in so doing, the damping force diminishes towards zero.

OBJECT OF THE INVENTION

The task of the present invention is to provide a viscous vibration damper, of the kind described at the beginning hereof, which develops a great damping force in the shock or impact direction, and which will cope with relatively large vibration paths.

BRIEF DESCRIPTION OF THE INVENTION

This problem is solved in that the plunger tube is designed as a downwardly open, hollow and continuously conical frustum, the smaller diameter end of which is turned to the top plate and the larger diameter end of which is turned to the damper housing, and which is provided, on its generated surface, lying underneath the surface of the damping medium, with a plurality of small diameter circulation holes. As a result of these measures, a vibration damper is created which, upon immersion movement of the damper plunger into the damper medium (in other words, in the shock or impact direction) has, in addition to a shear component, a component of compressive force. Optimum damping resistances are achieved when the true angle is in the range from 50° to 70°, preferably 60°. The cone may be designed as a frustum or as a truncated pyramid.

In one preferred version, provision is made for the larger cone diameter of the plunger tube to be closed off with a baffle plate which is provided with passage apertures and the plunger tube is closed off approximately in the region of the surface of the damping medium with a closure plate. By these measures, the damping force can be still further incresed; moreover the closure plate prevents the damping medium from rising into the upper plunger cavity.

Further advantageous features of the invention will be appreciated from the claims set forth at the conclusion of this specification as well as from the following detailed description of the preferred embodiments illustrated in the accompanying drawings.

DETAILED DESCRIPTION OF THE PREFERRED EMBODIMENTS

Figure 1:
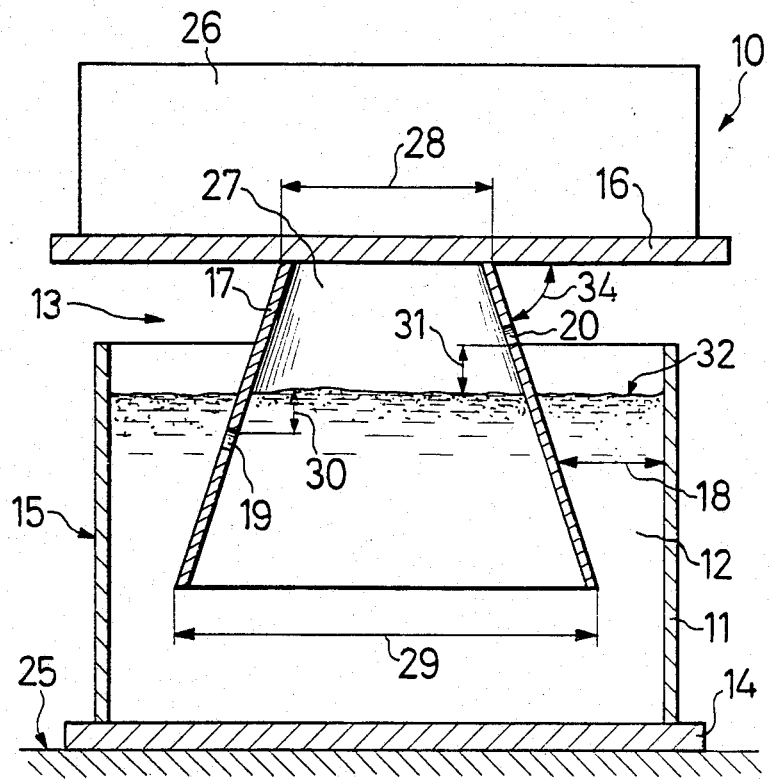
FIG. 1 is a schematic sectional elevation illustrating a preferred embodiment of the viscous damper having a conical plunger tube according to the invention.

Similar reference numerals have been allocated to similar parts in each of the four figures.

The damper 10 in FIGS. 1, 2, 3 and 4 in each case comprising essentially a damper housing 11, in which a damping medium 12 is contained and a damper plunger 13 which can be moved into and out of the damping medium 12.

The damper plunger 13 comprises a top plate 16 for the reception of a vibrating or oscillating object 26 and a plunger tube 17 which projects downwards and is immersed substantially in the damping medium 12. The plunger tube 17 is hollow and open at the bottom. On its generated surface lying below surface 32 of the damping medium 12, the plunger tube 17 is provided with a plurality of circulation bores 19. These circulation bores 19 act as throttles through which the damping medium 12 emerges in forced circulation when the plunger tube 17 moves downwards and is plunged inwards of the medium 12, whereby additional camping is achieved. The distance 30 between the circultion bores 19 and the surface 32 is chosen to be larger than the largest vibration amplitude that is to be expected, in order to prevent the possibility of air being worked into the damping medium 12.

Above the surface 32, the plunger tube 17 is provided with air balance holes 20, as a result of which trappig of air in the plunger cavity 27 is prevented. Such a trapped volume of air would be compressible and would, upon increased immersion of the plunger tube 17 and the air compression arising therefrom, act as a spring which can disadvantageously influence the isolation of vibrations. The spacing 31 of the holes 20 relative to the surface 32 of the damping medium 12 is greater than the greatest vibration amplitude that is to be expected.

The plunger tube 17 is, in the device in accordance with the invention, conical in configuration, the smaller cone diameter 28 facing and being connected to the top plate 16 and the large cone diameter 29 is downwardly directed and disposed in the damping medium 12. The cone angle 34 in the range of 50° to 70°, preferably it amounts to 60°. Because of this conicity, the pressure component in the damping medium 12 is increased and thus the failure limit shifted towards greater damping forces.

The damper housing 11 consists of a housing wall 15, which is preferably designed as a circular hollow cylinder. On its lower side remote from the damper plunger 13, the damper housing 11 is sealed in a mediumtight manner by a bottom plate 14. The damper 10 stands with its bottom plate 14 on the ground or a foundation 25.

Between the inner surface of the housing wall 15 and the outer surface of the plunger tube 17 there exists an annular gap 18 which is wedge-shaped in radial section and which, upon the immersion of the damping plunger 13, in other words in the pressure direction, brings about a greater displacement of damping medium 12 than is the case with the known cylindrical plunger tubes and with comparable volume ratios. This construction increases the damping forces in the pressure direction and reduces the vibration amplitudes. The wedge-shaped annular gap 18, in combination with the circulation bores 19 in the plunger tube 17, creates specific and predetermined circulation of the damping medium 12 during a vibratory movement; in this way, automatic pumping out of the damping medium is prevented. Very high damping forces can be absorbed over large periods of time, with high vibration loading.

Figure 2:
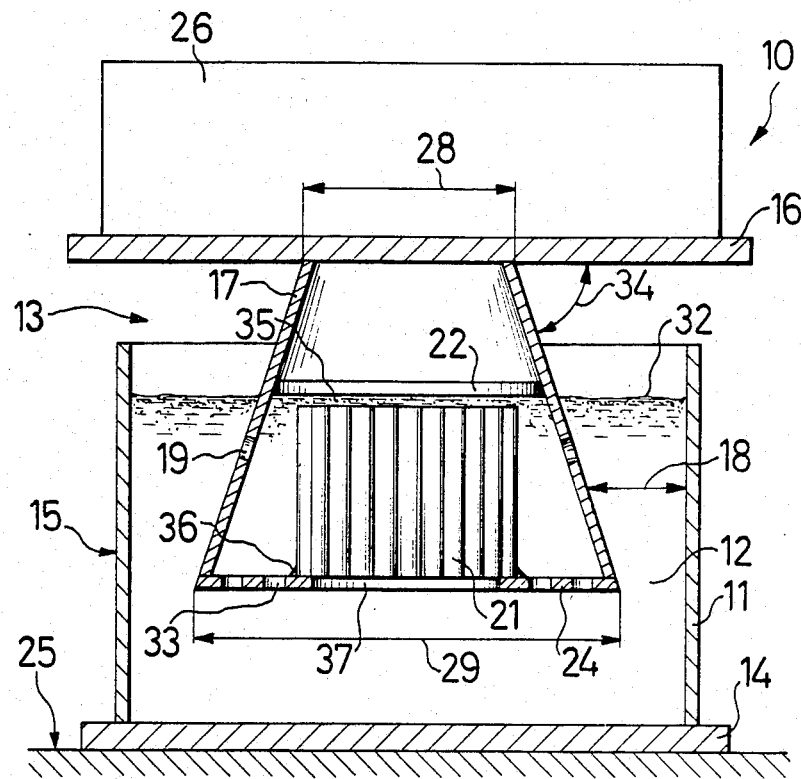
FIG. 2 is a view similar to FIG. 1 but illustrating an embodiment of the viscous damper having a conical plunger tube provided with a baffle plate and inner tubes.

In the embodiment illustrated in FIG. 2, associated with the large cone diameter 29 is a baffle plate 24 which is provided with small passage apertures 33 at its periphery and a large passage aperture 37 at its center. In these passage apertures 33, there arises an additional shearing action and thus an additional damping force. The plunger cavity 27 is closed internally towards the top by a closure place plate 22, by which rising of the damping medium 12 is avoided; the air balance bore 20 can, in this case, be dispensed with.

In addition to the baffle plate 24, additional inner tubes 21 may be arranged within the plunger cavity 27, which tubes also increases the damping force. These inner tubes 21 and the baffle plate 24 are not restricted in their use to conical plunger tubes; they can equally be used in the case of cylindrical plunger tubes. The inner tubes 21 are welded together into an essentially circular tube bank 38. In the area of the outer diameter of large center passage 37, tube bank 38 at its outer circumference is welded to baffle 24 by a welding seam 36. Opposite end cover 22, tube bank 38 is open with a continuous clearance 35.

Figure 3:
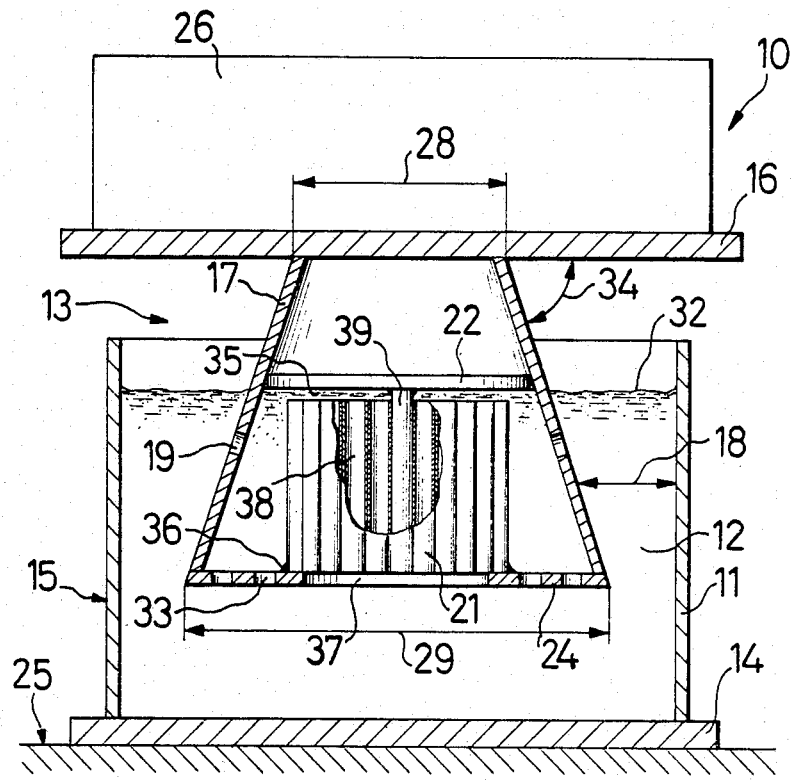
FIG. 3 illustrates the section through a viscous damper with conical plunger tube according to FIG. 1 with a central continuous support.

In the embodiment shown in FIG. 3, a central continuous support 39, made of a solid material, is allocated to tube bank 38. This support 39 is welded to the adjoining inner tubes 21 and end cover 21.

Figure 4:
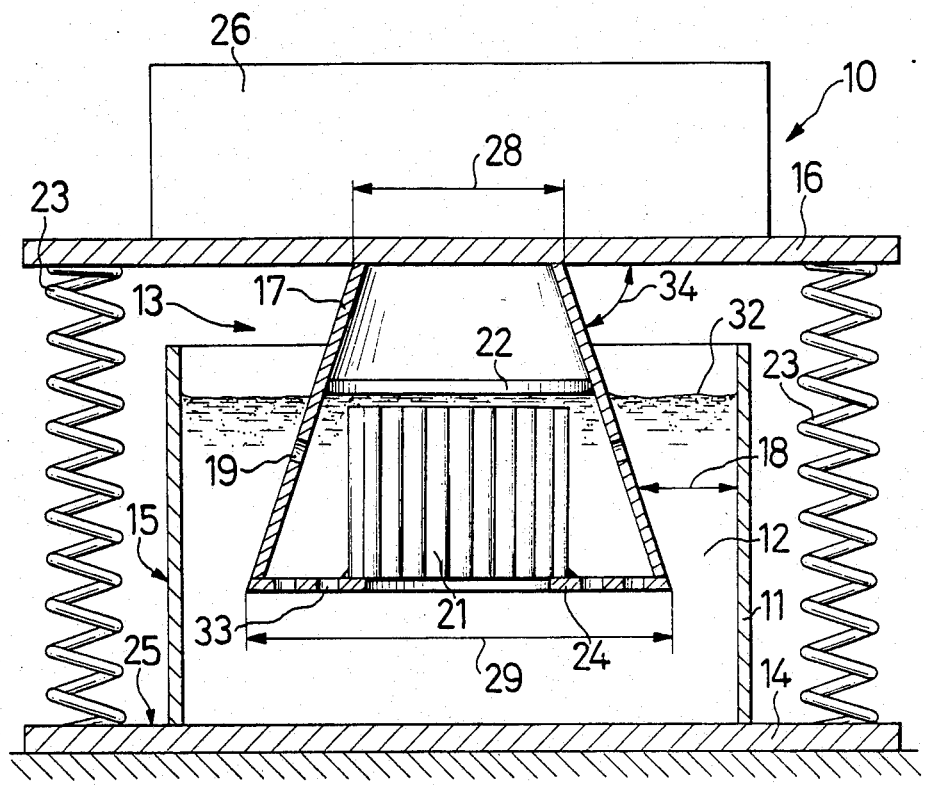
FIG. 4 is a view similar to FIGS. 1 to 3, but illustrating an embodiment having additional springs. extending parallel to the cone axis.

In the embodiment illustrated in FIG. 4, springs 23 are arranged, parallel to the axis of the damper housing 11, and of the plunger tube 17, between the bottom plate 14 and the top plate 16. In such a spring body having its incorporated damper 10, the mounting elasticity necessary for vibration isolation is achieved by these springs, which, in the case of the depicted exemplified embodiment, are designed as helical compression springs.

The springs 23 extend outside the damper housing 11 andbear the vibrating object. In this connection, the top plate 16 and the bottom plate 14 simultaneously provide spring support surfaces.

As a result of all the described measures, one obtains a compact structural unit for vibration isolation which provides a high damping effect in the pressure direction, which will cope with large vibration paths and operates effectively and efficiently over long periods of time.

I claim:

1. A vibration damper for an object that is to be mounted so as to be elastically yielding comprising:
    a damper housing containing a viscous damper medium;
    a damper plunger having a top plate for the reception of the object and a plunger tube positionable for moving into and out of said damper housing and said viscous damper medium, wherein said plunger tube defines as downwardly open, hollow and continuously conical frustrum, a small diameter end of said frustrum facing said top plate and a large diameter end of said frustrum extending into said damper housing, and
    a plurality of small diameter circulation bores extending through the conical surface of said continuously conical frustrum, whereby said viscous damper medium is throttled by circulation through said bores.

2. A vibration damper as claimed in claim 1 wherein said circulation bores lie at a distance below a surface of the damping medium which is greater than the largest vibration amplitude.

3. A vibration damper as claimed in claim 1, including air balance holes arranged in the conical plunger tube, at a larger spacing than the largest vibration amplitude above the surface of the damping medium.

4. A vibration damper as claimed in claims 1, 2 or 3 wherein said larger cone diameter end of the plunger tube is closed off by a closure plate which is provided with passage apertures, and the plunger tube is closed off approximately in the region of the surface of the damping medium by a respective closure sheet.

5. A vibration damper as claimed in claim 1 including additional inner tubes arranged in the plunger tube.

6. A vibration damper according to claim 5, wherein the inner tubes are welded together into a tube bank and with a center support continuing up to an end cover.

7. A vibration damper as claimed in claim 1 wherein the cone angle of the plunger tube is in the range of 50° to 70°.

8. A vibration damper as claimed in claim 1 wherein the top plate and a bottom plate are connected to one another by way of helical compression springs which extend parallel to the axis of the damper housing and outside the latter.

9. A vibration damper as claimed in claim 1 wherein the cone angle of the plunger tube is 60°.

* * * * *